United States Patent
Huang

(10) Patent No.: US 6,433,608 B1
(45) Date of Patent: Aug. 13, 2002

(54) DEVICE AND METHOD FOR CORRECTING THE BASELINE WANDERING OF TRANSMITTING SIGNALS

(75) Inventor: Chen-Chih Huang, Hsin Chu (TW)

(73) Assignee: Realtek Semi-Conductor Co., Ltd., Hsin Chu (TW)

( * ) Notice: Subject to any disclaimer, the term of this patent is extended or adjusted under 35 U.S.C. 154(b) by 0 days.

(21) Appl. No.: 09/753,909

(22) Filed: Jan. 2, 2001

(51) Int. Cl.[7] ............................................. H03L 5/00
(52) U.S. Cl. ........................ 327/307; 327/61; 330/85; 330/259
(58) Field of Search ................................ 327/307, 361; 330/254, 253, 259, 260, 85

(56) References Cited

U.S. PATENT DOCUMENTS

| | | | | |
|---|---|---|---|---|
| 5,471,665 A | * | 11/1995 | Pace et al. | 330/259 |
| 5,489,873 A | * | 2/1996 | Kamata et al. | 327/558 |
| 5,517,141 A | * | 5/1996 | Abdi et al. | |
| 5,648,738 A | * | 7/1997 | Welland et al. | 327/307 |
| 5,798,664 A | * | 8/1998 | Nagahori et al. | 327/307 |
| 6,188,282 B1 | * | 2/2001 | Montalvo | 330/260 |
| 6,275,098 B1 | * | 8/2001 | Uehara et al. | 327/307 |
| 6,288,604 B1 | * | 9/2001 | Shih et al. | 330/253 |

* cited by examiner

Primary Examiner—Terry D. Cunningham
(74) Attorney, Agent, or Firm—Martine & Penilla, LLP

(57) ABSTRACT

A device and method for correcting the baseline wandering of transmitting signals are disclosed. The present method and device are used to correct the baseline wandering of the first output terminal and the second output terminal of a receiver as a result of induction effect of the transformer. The present device comprises a compensation current source including a first compensation output terminal and a second compensation output terminal which are respectively connected to the first output terminal and the second output terminal of the receiver. The device further includes a voltage signal generator for generating a control voltage to control the compensation current source. The voltage signal generator employs the voltage difference of the first output terminal and the second output terminal of the receiver and a reference voltage to control the control voltage. Thereby, the compensation current value of the compensation current source is supplied to the first output terminal and the second output terminal of the receiver and is used to correct the baseline wandering.

8 Claims, 6 Drawing Sheets

DEVICE AND METHOD FOR CORRECTING THE BASELINE WANDERING OF TRANSMITTING SIGNALS

BACKGROUND OF THE INVENTION

A. Field of the Invention

The present invention relates to a device and method for correcting the baseline wandering of transmitting signals, and in particular, a device and method for correcting the baseline wandering of transmitting signals by employing a compensation current source to compensate the baseline wandering.

B. Description of the Related Art

FIG. 1 is an equivalent circuit diagram of a conventional receiver 10 comprising resistors 11,12, and current sources 13, 14. The output voltage Vo of the receiver 10 is denoted by Vo=Vop−Von, that is, $$Vo = (Vdd - (-IoR) - (Vdd - IoR)) \quad (1)$$
$$= 2IoR$$

wherein, Vo is the output voltage of the receiver 10, and R is equivalent output impedance, and Io is the current of the current source received by transformer, and assuming that the effect of the wires or cables can be negligible or is equalized.

In addition, due to the fact that the receiver is output by the transformer, and therefore, the output voltage Vo(S) after Laplace transformation is represented as follows:

$$Vo(S) = Vs(S) * \frac{SL}{2SL + Ro} \quad (2)$$

wherein, Vs(S) is the signal source and the signals are digital signal, and SL/(2SL+Ro) is a transfer function of the transformer. Thus, by combining the above Equations (1) and (2), the current Io(S) is obtained and is represented as follows:

$$Io(S) = Vs(S) * \frac{SL}{(2SL + Ro)2R} \quad (3)$$

From Equation (3), $$\frac{SL}{(2SL + Ro)2R}$$

is a high-pass transfer function. Thus, the DC signal of the Vs(S) will be isolated and cannot pass through, i.e., when the transmitting signals appear a same signal string, "0" or "1", the same signal string is regarded as DC signals, which cause the wandering of the DC level of Vo(S) or is known as baseline wandering. This baseline wandering will cause the receiver to output error signals. FIG. 2 shows the waveforms of the input voltage and the output voltage passed through the transformer. When the voltage level at the input terminal is not uniform, for instance the signals for high potential are longer than that of the low potential, (as shown in FIG. 2(A)). The downward wandering of DC Voltage potential, as shown in 2(B), will form, and this wandering will be accumulated. When the DC voltage potential is wandering downward or upward to a certain extent, i.e., when it is lower or higher than the threshold potential, it will cause error in the output signals of the receiver.

SUMMARY OF THE INVENTION

In view of the above drawbacks, it is an object of the present invention to provide a device and method for correcting the baseline wandering of transmitting signals by employing a compensation current source.

In accordance with a device of the invention there is disclosed a device for correcting the transmitting signals baseline wandering at the first output terminal and the second output terminal of the receiver as a result of induction effect of the transformer. The device comprises a compensation current source including a first compensation output terminal and a second compensation output terminal which are respectively connected to the first output terminal and the second output terminal of the receiver. The device further comprises a voltage signal generator for generating control voltage to control the compensation current value of the compensation current source. The voltage signal generator generates the control voltage according to the voltage difference of the first output terminal and the second output terminal of the receiver and a reference voltage. Thereby, the baseline wandering can be corrected by the compensation current value of the compensation current source.

In accordance with a device of the invention there is disclosed a method for correcting the transmitting signals baseline wandering at the first output terminal Vop and the second output terminal Von of the receiver as a result of induction effect of the transformer. The method comprises the steps of:

(a) comparing the voltage difference Vop−Von of the first output terminal and the second output terminal with a voltage threshold Vth, if the voltage difference Vop−Von is higher than the voltage threshold Vth, output a control voltage which is charged by a condenser (capacitor);

(b) comparing the voltage difference Von−Vop of the second output terminal and the first output terminal with the voltage threshold Vth, if the voltage difference is higher than the voltage threshold Vth, output a control voltage which is reverse-charged by the condenser;

(c) generating a compensation current by the control voltage; and (d) supplying the compensation current to the first output terminal and the second output terminal.

In accordance with the invention, because a voltage charged by a condenser is used to control the current value of the compensation current, which is supplied to the output terminal, it is effectively in compensating baseline wandering formed as a result of the characteristics of the induction effect of the transformer.

Yet further objections and advantages of the present invention will become more apparent from the following description taken in conjunction with the accompanying drawings.

BRIEF DESCRIPTION OF THE DRAWINGS

These and other objects and advantages of the present invention will become apparent by reference to the following description and accompanying drawings wherein.

DETAIL DESCRIPTION OF THE INVENTION

Figure 1:
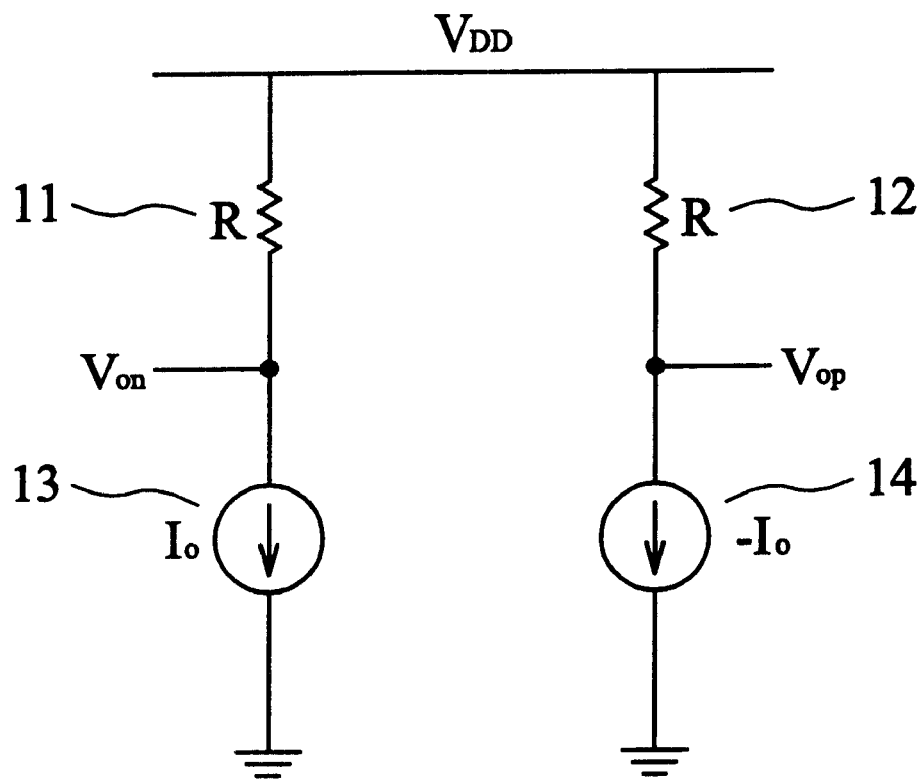
FIG. 1 shows an equivalent circuit diagram of a conventional transmitting signals receiver.
Figure 2:
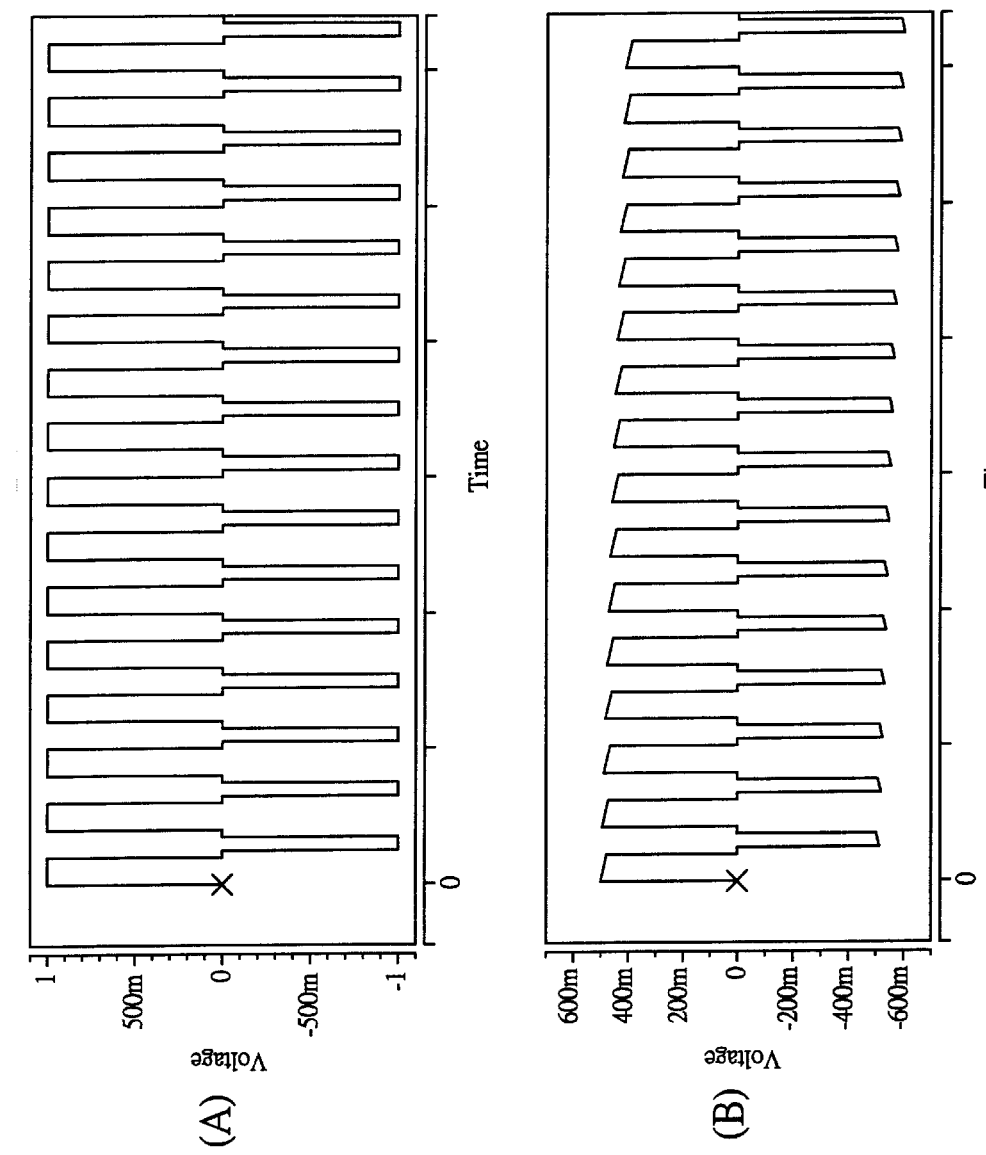
FIG. 2 shows the waveform of the output terminal voltage after the voltage at the input terminal passes through the transformer.
Figure 3:
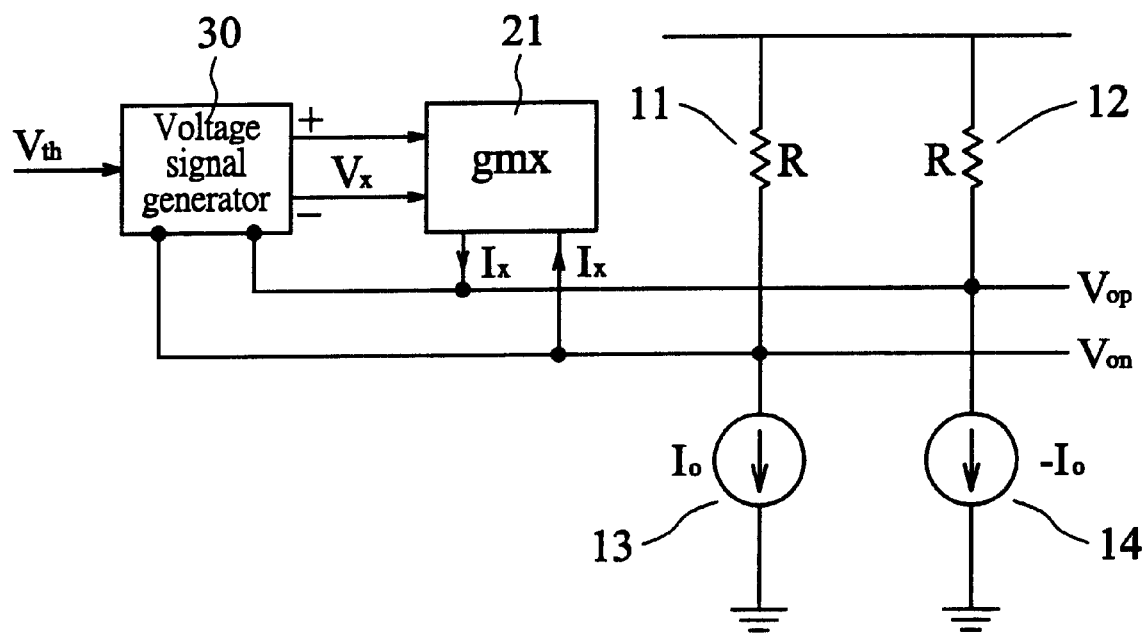
FIG. 3 shows an equivalent circuit diagram of a transmitting signals receiver having a device for correcting the baseline wandering in accordance with the present invention.

FIG. 3 is a circuit diagram showing the device for correcting the baseline wandering of transmitting signals used in a receiver in accordance with the present invention. In accordance with the present invention, the device 20 comprises a voltage signal generator 30, and a compensation current source 21 controlled by the control voltage Vx output from the voltage signal generator 30. The current output terminals Iop, Ion of the compensation current source 21 are respectively connected to the voltage output terminals Vop and Von of the equivalent circuit (referring to FIG. 1) of the receiver. In addition, the compensation current Ix of the compensation current source 21 is controlled by the control voltage Vx, i.e., $$Ix=Vx*gmx \qquad (4)$$

wherein, gmx is the transconductance of the transconductor. Thus, by compensating the variation of output current Io as a result of induction of the transformer with the compensation current value Ix, the baseline wandering is effectively corrected.

Figure 4:
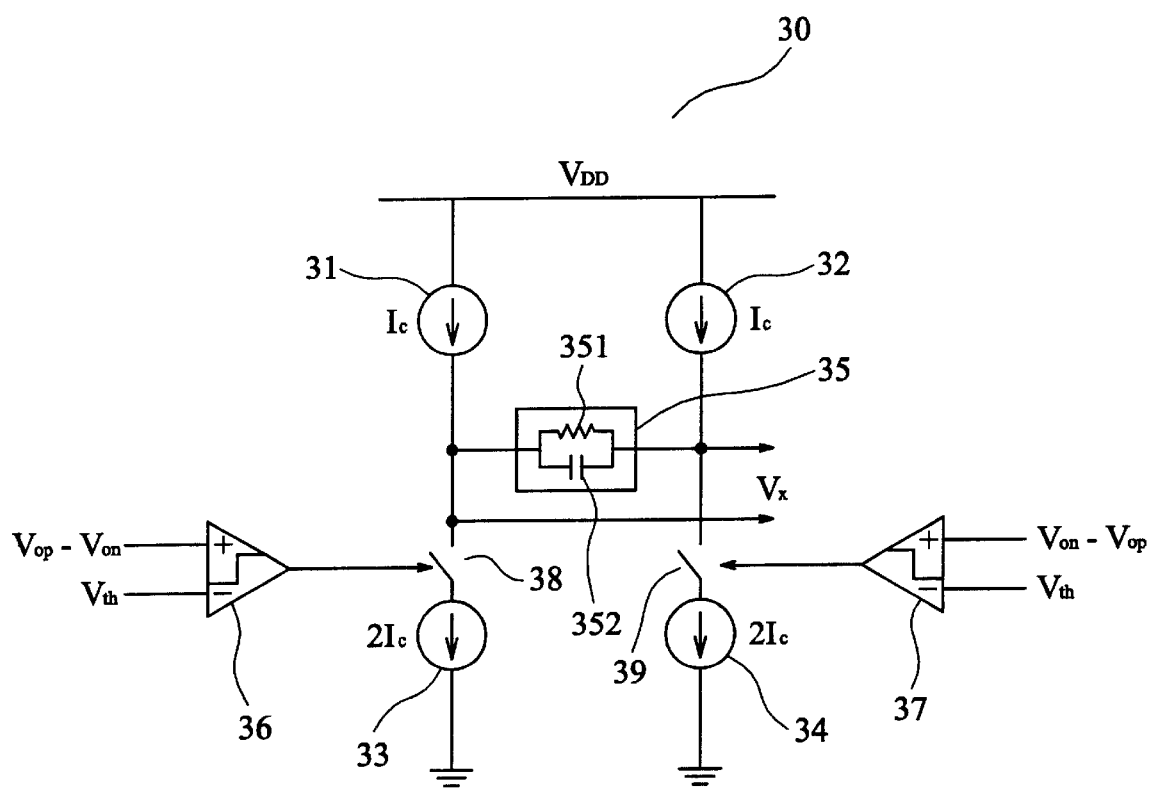
FIG. 4 is a circuit diagram of the voltage control unit of FIG. 3 of the present invention.

FIG. 4 shows the circuit diagram of a portion of the voltage signal generator 30 illustrated on FIG. 3. The voltage signal generator 30 comprises a first and a second current source 31, 32 having equivalent current, an impedance 35, a third and a forth current source 33, 34 with current twice than that of the first and the second current source 31, 32, and a first and a second switch 39 for controlling the third and the forth current source 33, 34. The impedance 35 includes a resistor 351 and a condenser 352 which are connected to one terminal of the first and second current source 31, 32, respectively. In addition, the voltage signal generator 30 further comprises two comparators 36, 37 to control the action of the first and the second switch 38, 39.

In accordance with the present invention, the first comparator 36 is used to compare whether the voltage difference Vop−Von is higher than the voltage threshold Vth. That is, if the voltage difference of Vop−Von is higher than the voltage threshold Vth, then a signal is output to the first switch 38 to cause the switch 38 to switch on. At this instance, due to the fact that the second switch 39 is not switched on, the current Ic of the second current source 32 passes through the impedance 35, and passes through the first switch 38 and the third current source 33 simultaneously with the first current source 31. At this instance, the condenser 352 starts to re-charge and the control voltage increases gradually.

The second comparator 37 is used to compare whether the voltage difference of Von−Vop is higher than the voltage threshold Vth. That is, if the voltage difference of Von−Vop is higher than the voltage threshold Vth, then a signal is output to the second switch 39 to cause the switch 39 to switch on. At this instance, due to the fact that the first switch 38 is not switched on, the current Ic of the first current source 31 passes through the impedance 35. Then the current Ic of the first current source 31 passes through the second switch 39 and the forth current source 34 simultaneously with the current Ic of the second current source 32. At this instance, the condenser 352 starts to recharging, and the control voltage decreases gradually.

In addition, when both the first switch 38 and the second switch 39 are not switched on, the condenser 352 releases current via the resistor 351 and restores to the initial status. That is, at the state where the voltage is discharging to zero.

Figure 5:
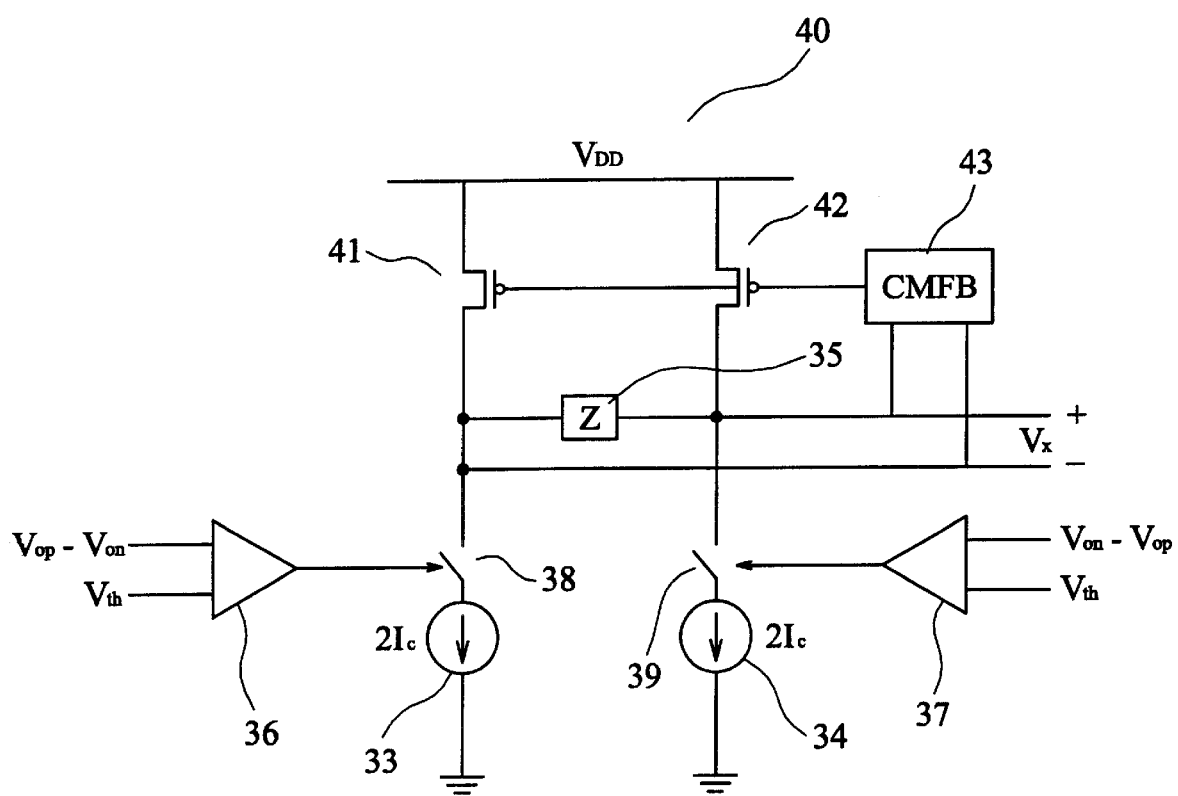
FIG. 5 is another mode of FIG. 4 of the present invention.

FIG. 5 is a circuit diagram of another preferred embodiment of voltage signal generator as shown in FIG. 3. As shown in the figure, the voltage signal generator 40 and that of FIG. 4 are substantially similar. The only difference is that the first and the second current source 31, 32 of the voltage signal generator 30 are replaced with the transistors 41, 42, and a common mode feedback unit 43 is added to avoid common mode voltage wandering of the transistors 41, 42. The function and the purpose of other elements of the voltage signal generator 40 are similar to that of the voltage signal generator 30, and the same are not described hereinafter.

The following equations are used to explain the action of the present invention. Referring again to FIGS. 3 and 4, in accordance with the present invention, the receiver 10 is incorporated with the compensation current source 21. Thus, the output Vo is $$Vo=Vop-Von=-(-Ix-Io)R+(Io+Ix)R=2(Io+Ix)R=2RIo+2RIx$$

The Equation (4) is substituted into the above equation and the Equation (5) is obtained after Laplace transformation.

$$Vo(S) = Vs(S) * \frac{SL}{2SL+Ro} + 2R*Vx(S)*gmx \qquad (5)$$

Figure 6:
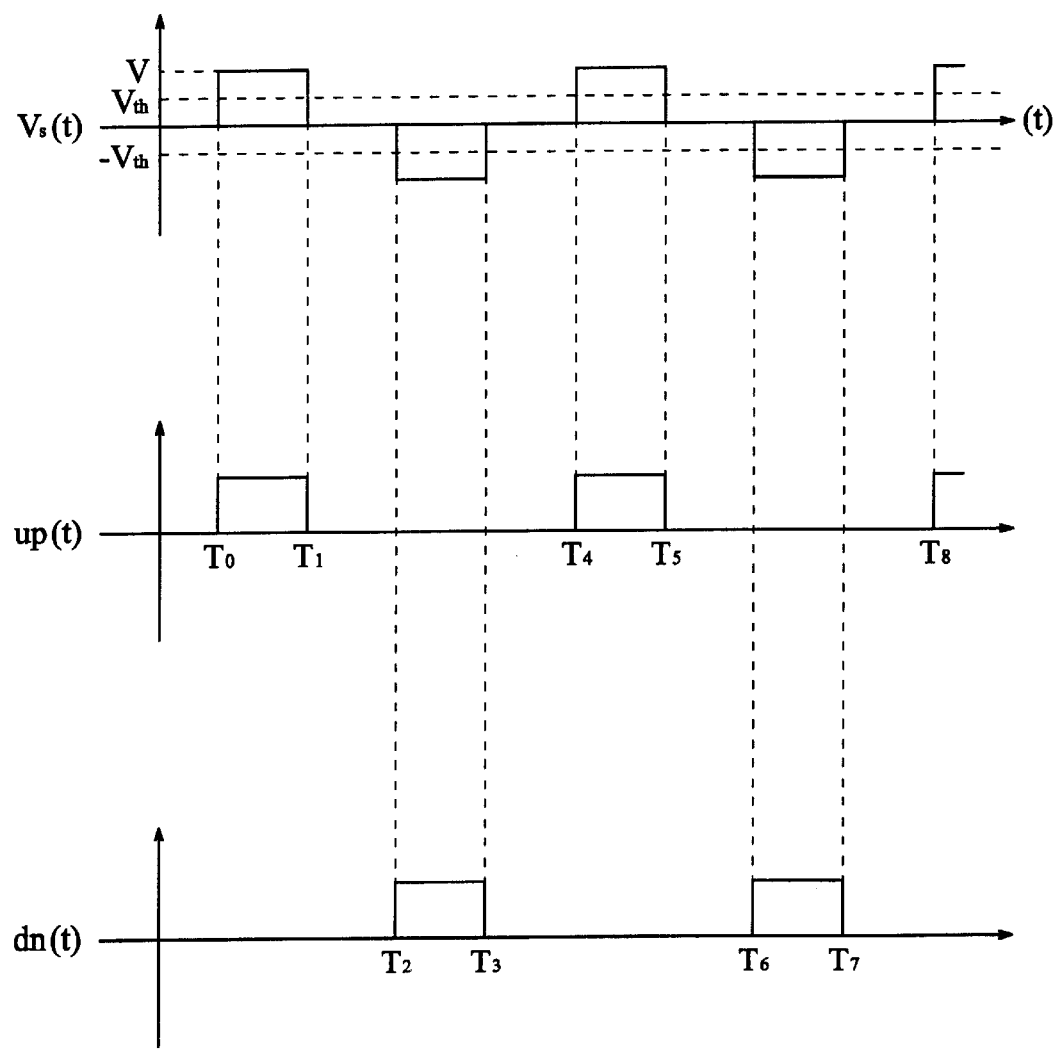
FIG. 6 shows the waveform of signal source Vs(t), the first switch the second switch of the present invention.

Assuming the waveform of the signal source Vs(t) is shown as that in FIG. 6, then, after Laplace transformation the signal source Vs(t) is:

$$Vs(S) = \frac{V}{S}\sum_{n}(-1)^n[e^{-ST2n}-e^{-ST2n+1}] \qquad (6)$$

As shown in FIG. 6, the derivative function up(t) and dn(t) of the first and the second switch 38, 39 of FIG. 4 are respectively denoted as $$up(t)=\{[u(t-T0)-u(t-T1)+u(t-T4)-u(t-T5)\ldots]\}$$

$$dn(t)=\{[u(t-T2)-u(t-T3)+u(t-T6)-u(t-T7)\ldots]\}$$

It is understood from FIG. 4 that the equation of the control voltage Vx(t) after Laplace transformation is $$L(Vx(t))=Z*L[Ic*up(t)+(-Ic)*dn(t)]$$

$$Vx(S) = Ic*\frac{Rx}{1+SRxC}*\frac{1}{S}*\sum_{n}(-1)^n(e^{-ST2n}-e^{-ST2n+1}) \qquad (7)$$

Assume that X(S) is defined as $$X(S) \equiv \sum_{n}(-1)^n(e^{-ST2n}-e^{-ST2n+1}) \qquad (8)$$

Equation (8) is substituted into Equation (6) and (7), then Equations (6) and (7) become $$Vs(S) = \frac{V}{S}X(S) \qquad (9)$$

-continued $$Vx(S) = Ic * \frac{Rx}{1+SRxC} * \frac{1}{S} * X(S) \tag{10}$$

Next, Equations (9) and (10) are substituted into Equation (5), then Equation (5) becomes $$Vo = \frac{V}{S}X(S) * \frac{SL}{2SL+Ro} + 2R*gmx * \frac{Rx}{1+SRxC} * Ic * \frac{1}{S} * X(S)$$

after simplification, $$Vo = X(S)\left(\frac{V}{S} * \frac{SL}{2SL+Ro} + 2R*gmx * \frac{Rx}{1+SRxC} * Ic * \frac{1}{S}\right) = \tag{11}$$

$$X(S)\left\{\left(\frac{\frac{1}{2}V}{S+\frac{Ro}{2L}}\right) + 2R*gmx*Ic * \left(\frac{\frac{1}{C}}{S\left(S+\frac{1}{RxC}\right)}\right)\right\}$$

Let $$\frac{Ro}{2L} = \frac{1}{RxC}$$

then equation (11) can be simplified to $$Vo(S) = X(S)\left(\frac{\frac{V}{2}S + \frac{2R*gmx*Ic}{C}}{S\left(S+\frac{1}{RxC}\right)}\right) \tag{12}$$

Let $$\frac{4RgmxIc}{VC} = \frac{1}{RxC},$$

then Equation (12) can further be simplified to $$Vo(S) = X(S)\left(\frac{V}{2S}\right) = \frac{1}{2}Vs(S) \tag{13}$$

i.e., after Laplace reverse transformation, $$Vo(t) = \frac{1}{2}Vs(t) \tag{14}$$

Thus, from Equation (14), it is understood that the output voltage Vo(t) and the signal source Vs(t) are directly proportional and will not be affected by the transfer function of the transformer. Accordingly, when the receiver is incorporated with a correcting device of the present invention, the baseline wandering caused by the transformer of the receiver can be corrected.

It should be understood that various alternatives to the structures described herein may be employed in practicing the present invention. It is intended that the following claims define the invention and that the structure within the scope of these claims and their equivalents be covered thereby.

While this invention has been described with reference to an illustrative embodiment, this description is not intended to be construed in a limiting sense. Various modifications and combinations of the illustrative embodiment, as well as other embodiments of the invention, will be apparent to persons skilled in the art upon reference to the description. It is therefore intended that the appended claims encompass any such modifications or embodiments.

What is claimed is:

1. A device for correcting the baseline wandering of transmitting signals, which is used to correct the baseline wandering of a first output terminal and a second output terminal of a receiver as a result of induction effect of the transformer, comprising:

a compensation current source including a first compensation output terminal and a second compensation output terminal which are connected to the first output terminal and the second output terminal of the receiver, respectively;

a voltage signal generator for generating a control voltage to control the compensation current value of the compensation current source, said voltage signal generator determining a voltage difference from the first output terminal and the second output terminal of the receiver and a reference voltage to control the control voltage and comparing the voltage difference to the reference voltage;

thereby the baseline wandering of transmitting signals of the receiver is corrected by the compensation current value of the compensation current source.

2. The device for correcting the baseline wandering of transmitting signals as set forth in claim 1, wherein the voltage signal generator comprises:

a first current source having a first terminal and a second terminal, the first terminal being connected to a high potential level;

a second current source with a current value identical to that of the first current source and having a first terminal and a second terminal, the first terminal being connected to the high potential level;

an impedance having two terminals connected to the second terminals of the first and second current source, respectively;

a first switch having a first terminal and a second terminal, the first terminal being connected to the second terminal of the first current source;

a second switch having a first terminal and a second terminal, the first terminal being connected to the second terminal of the second current source;

a third current source with a current value substantially twice than that of the first current source and having a first terminal and a second terminal, the first terminal being connected to the second terminal of the first switch and the second terminal being connected to a low potential level;

a fourth current source with a current value identical to that of the third current source and having a first terminal and a second terminal, the first terminal being connected to the second terminal of the second switch and the second terminal being connected to the low potential level;

a first comparator for controlling the first switch by comparing the voltage difference of the first output terminal and the second output terminal of the receiver and the reference voltage; and a second comparator for controlling the second switch by comparing the voltage difference of the second output terminal and the first output terminal of the receiver and the reference voltage;

thereby, the voltage of the two terminals of the impedance is output as the control voltage.

3. The device for correcting the baseline wandering of transmitting signals as set forth in claim 2, wherein the first current source and the second current source are transistors.

4. The device for correcting the baseline wandering of transmitting signals as set forth in claim 2, wherein the impedance includes a resistor in parallel with a condenser.

5. The device for correcting the baseline wandering of transmitting signals as set forth in claim 2, wherein the impedance includes a voltage controlled current source in parallel with a condenser.

6. The device for correcting the baseline wandering of transmitting signals as set forth in claim 5, wherein the voltage controlled current source employs the voltage at the two terminals of the condenser as the control voltage.

7. A method for correcting the baseline wandering of transmitting signals, which is used to correct the baseline wandering of the first output terminal Vop and the second output terminal Von of the receiver as a result of induction effect of the transformer, comprising the steps of:

comparing the voltage difference of the first output terminal and the second output terminal with a threshold voltage, and outputting a control voltage which is charged by a condenser if the voltage difference is higher than the threshold voltage;

comparing the voltage difference of the second output terminal and the first output terminal with the threshold voltage, and outputting the control voltage which is reverse-changed by the condenser if the voltage difference is higher than the threshold voltage;

generating a compensation current by the control voltage; and supplying the compensation current to the first output terminal and the second output terminal of the receiver.

8. A device for correcting the baseline wandering of transmitting signals, which is used to correct the baseline wandering of a first output terminal and a second output terminal of a receiver as a result of induction effect of the transformer, comprising:

(a) a compensation current source including a first compensation output terminal and a second compensation output terminal which are connected to the first output terminal and the second output terminal of the receiver, respectively;

(b) a voltage signal generator for generating a control voltage to control the compensation current value of the compensation current source, said voltage signal generator employing a voltage difference from the first output terminal and the second output terminal of the receiver and a reference voltage to control the control voltage, the voltage signal generator including, (i) a first current source having a first terminal and a second terminal, the first terminal being connected to a high potential level;

(ii) a second current source with a current value identical to that of the first current source and having a first terminal and a second terminal, the first terminal being connected to the high potential level;

(iii) an impedance having two terminals connected to the second terminals of the first and second current source, respectively;

(iv) a first switch having a first terminal and a second terminal, the first terminal being connected to the second terminal of the first current source;

(v) a second switch having a first terminal and a second terminal, the first terminal being connected to the second terminal of the second current source;

(vi) a third current source with a current value substantially twice than that of the first current source and having a first terminal and a second terminal, the first terminal being connected to the second terminal of the first switch and the second terminal being connected to a low potential level;

(vii) a fourth current source with a current value identical to that of the third current source and having a first terminal and a second terminal, the first terminal being connected to the second terminal of the second switch and the second terminal being connected to the low potential level;

(viii) a first comparator for controlling the first switch by comparing the voltage difference of the first output terminal and the second output terminal of the receiver and a reference voltage; and (ix) a second comparator for controlling the second switch by comparing the voltage difference of the second output terminal and the first output terminal of the receiver and the reference voltage, wherein the voltage of the two terminals of the impedance is output as the control voltage;

whereby the baseline wandering of transmitting signals of the receiver is corrected by the compensation current value of the compensation current source.

* * * * *